Figure 1:
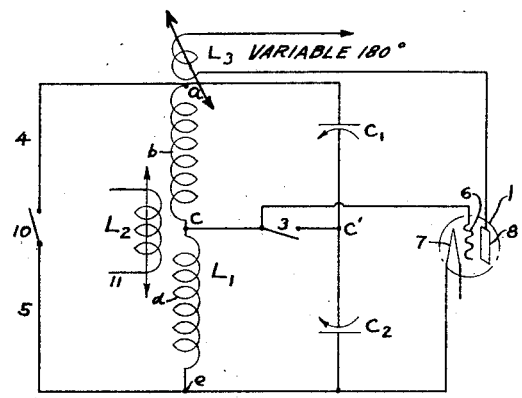
Figure 1A:
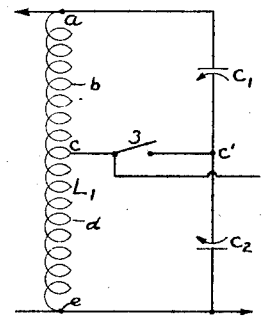

Feb. 19, 1929.                                                                1,702,917
J. E. PARKER
MULTIPLE WAVE DETECTION AND TRANSMISSION APPARATUS
Filed March 23, 1927            2 Sheets-Sheet 1

James E. Parker
INVENTOR.

BY
ATTORNEYS.

Feb. 19, 1929.
J. E. PARKER
1,702,917

MULTIPLE WAVE DETECTION AND TRANSMISSION APPARATUS

Filed March 23, 1927  2 Sheets-Sheet 2

James E. Parker
INVENTOR.

BY Robert A. Lavender
ATTORNEYS.

Patented Feb. 19, 1929.

1,702,917

UNITED STATES PATENT OFFICE.

JAMES E. PARKER, OF WASHINGTON, DISTRICT OF COLUMBIA.

MULTIPLE WAVE DETECTION AND TRANSMISSION APPARATUS.

Application filed March 23, 1927. Serial No. 177,752.

My invention relates broadly to multiple wave transmitters and detectors and more particularly to the circuits used in each and in the apparatus constituting a combination of the two.

It is well known that the detection of radio signals transmitted by distant broadcasting stations is subject to interference caused by the response of the detecting circuits to disturbances arising from nearby or powerful transmitting stations, from "static" and "strays" or from miscellaneous sources of energy radiation.

The loop receptor, the unidirectional receiver, loose coupled circuits in cascade, "acceptor and rejector" circuits, "wave-traps," shielding and other methods of filtering and obtaining directive and selective reception have been resorted to with results that have not been satisfactory.

The object of my invention is the production of a circuit in which detection or transmission may be accomplished with the reduction of extraneous interference to a minimum heretofore unattained.

Another object of my invention is a new and novel method and means for accomplishing selective detection and amplification of signals consisting in part of utilizing separately or in combination the additive and the substractive results and effects of mutual inductance in a coil system.

Further objects of my invention will appear more fully hereinafter as the description of the method and apparatus is developed.

My invention consists substantially in the construction, combination and arrangement of parts associated therewith or as will be more fully hereinafter set forth as shown by the accompanying drawings and finally pointed out in the appended claims.

Figure 2:
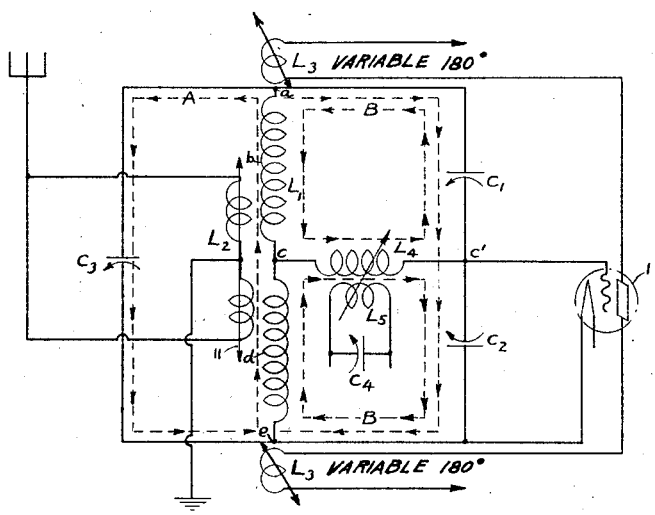
Figure 3:
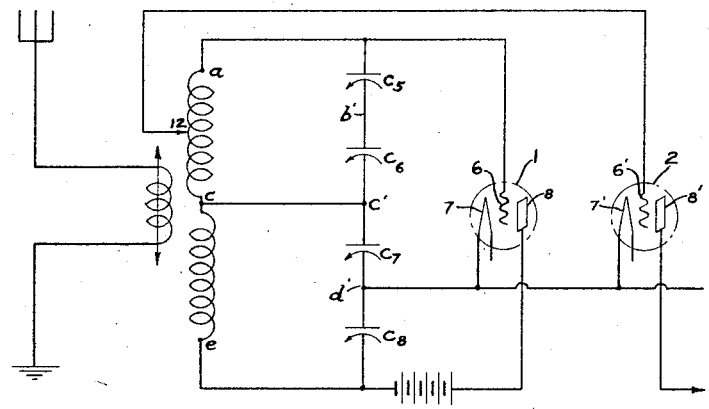
Figure 4:
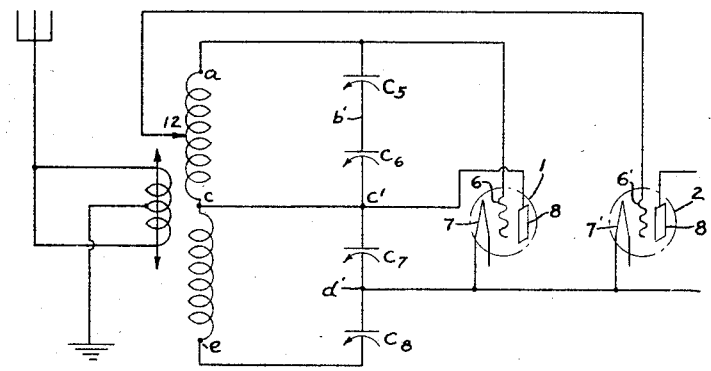

Reference is to be had to the accompanying drawings forming a part of this specification in which like reference characters indicate corresponding parts throughout the several views and in which:

Figure 1 is a circuit diagram of my invention as applied to a simple receiver circuit, Figure 1ᵃ is a modification thereof, Figure 2 is a further modification thereof, Figure 3 is a combined transmitter and receiver circuit embodying the principles of my invention, and Figure 4 is a modification thereof.

It is known that two inductances, if brought into relationship with each other, may have a total value of inductances greater than the sum of the two individual sections or that by reversing the position of one section, the total value of inductance may be less than that of the algebraic sum of the values of the two sections. This effect is typical of the functioning of a variometer in which the reacting inductances are movable relative to each other.

My invention covers the method and means for obtaining greater and lesser values of inductance without requiring a change in the position or relationship of the sections that comprise the coil system, and the utilization of this method and means for obtaining a signal free from undesirable interference, or the reduction to a minimum of the effect of such interference, with the highest degree of efficiency consistent with simplicity of construction and operation.

Referring particularly to Figures 1 and 1ᵃ, in which is shown a simple solenoid type of inductance in combination with a capacity or capacities, $L^1$ designates a coil system in which the total inductance is greater than that of the sum of the inductance of any two sections such as $a$—$b$ plus $b$—$e$, or $a$—$c$ plus $c$—$e$, each considered separately.

In parallel with the coil $L^1$ are a plurality of condensers $C^1$ and $C^2$ connected in series. The electrical center of the condenser system is connected to the electrical center of the coil system by the connection $c$—$c'$. The grid 6 of the vacuum tube 1 is connected to the point $c$ of the coil system or may be connected to the point $c'$ of the condenser system. The filament of the vacuum tube is connected to the point $e$ of the condenser system. The plate of the vacuum tube is connected through the coil $L^3$ through a source of plate current supply to the filament of the vacuum tube.

The circuit $L^1$ ($C^1$ plus $C^2$) is responsive to the frequencies to which it is tuned. This resonant effect depends upon the LC values involved, relative to the points upon the coil that are connected to the condensers.

When the circuit is tuned to resonance for a particular frequency points $a$ and $e$ will be at a particular instant, at equal and opposite potentials relative to each other. At the same given instant the potentials at points $a$ and $e$ are equal and opposite with respect to a midway point $c$; points $a$ and $c$ are equal and opposite with respect to a midway point $b$; points $c$ and $e$ are equal and opposite with respect to a midway point $d$; and points $b$ and $d$ are equal and opposite with respect to a midway point $c$.

When the inductance of the section $a$—$c$ is equal to that of $c$—$e$ and the capacity of condenser $C^1$ is equal to the capacity of condenser $C^2$, the potentials at points $c$ and $c'$ are equal and of like polarity at any given instant. Points $c$ and $c'$ may therefore be connected together without any flow of current between the two. A switch 3 may be included, as shown, to open or close this connection for securing certain functions described hereinafter.

In the following description, the frequency at which the points $a$ and $e$ are equal and opposite in potential and polarity will be referred to as the "A" frequency. When the coil $L^1$ is excited by a current of the "A" frequency through any well known means, such as by capacity or inductive coupling to a suitable circuit, by the functioning of the coils as loops, or by being self-excited and oscillating in conjunction with a vacuum tube circuit. The coil $L^3$ functions as a regenerative coupling to the coil $L^1$.

The coil $L^3$ is capable of revolution through 180 degrees about its axis from a position parallel to coil $L^1$, through a position at right angles thereto, and to a position parallel to the coil $L^1$ but opposite to its original position.

The plate 8 of vacuum tube 1 is connected to the filament 7 of the vacuum through the coil $L^3$ and a source of plate current supply. The filament 7, in turn, is connected to the point $e$ on the coil $L^1$. The grid may be connected to points $a$, $b$, $c$, or $d$, according to the voltage desired.

For explanation purposes only the grid is shown connected to the point $c$ of the coil system $L^1$. The arrangement of parts and the adjustments of the same are such that the system will oscillate at the "A" frequency with the coil $L^3$ set at a position parallel with the coil $L^1$ and will regenerate between this oscillating position, hereinafter designated as the 0 position, and the position at approximately 90 degrees with the coil $L^1$, that is at the position of zero coupling. When the coil $L^3$ is between the 0 and 90 degree position the system will be found to be resonant at the "A" frequency whether the switch 3 is closed or open.

With all other conditions and constants remaining the same, I have found that the system will regenerate and oscillate at a frequency other than the "A" frequency if the switch 3 is closed and the coil $L^3$ is in a position between 90 and 180 degrees from the 0 position. This frequency will hereinafter be referred to as the "B" frequency.

The system as shown in Figure 1 is resonant at two definite frequencies according to the position of the coil $L^3$ and the condition of the switch 3. I have found further that the points $a$ and $e$ may or may not be connected together without changing the "B" frequency. This I have accomplished by means of the connection $a$—$e$ in which there is a switch 10.

However, if the points $a$ and $e$ are connected together by the wires 4 and 5 and the switch 10, the system is nonresonant to the "A" frequency. Thus, referring to Figure 1, if the switches 3 and 10 are open the system is resonant to the "A" frequency. If the switches 3 and 10 are closed the system is resonant to the "B" frequency.

By means of this arrangement it is possible to reduce to a minimum the tendency of the coil system $L^1$ to respond to energy other than that transmitted through the medium of the coil $L^2$ at the "B" frequency. By closing the switch 10 I remove the tendency of the coil and vacuum tube combination to respond to, regenerate, or oscillate at the "A" frequency, the tendency of the coil system $L^1$ functioning as a loop being to respond to signals of the "B" frequency and to be practically non-resonant to frequencies slightly removed from that frequency.

When the points $a$ and $e$ are connected together, they are at the same potential with respect to each other but both points are at an equal and opposite potential with respect to the points $c$ and $c'$. The current flow in the section $a$—$c$ of the coil system is equal and opposite to the current flow in the section $c$—$e$ as indicated by the dotted arrows in Figure 2. All extraneous disturbances that would tend to induce a current in the section $a$—$c$ are neutralized for the reason that the current flows in the same direction as the current induced in the section $c$—$e$ and in the opposite direction to the current flowing in the coil system $c$—$e$ functioning at the "B" frequency.

In the position shown in Figure 1, the coil $L^2$ will impart energy equally to sections $a$—$c$ and $c$—$e$ of coil system $L^1$. With the points $a$ and $e$ connected together, the coil system $a$—$e$ will not respond to currents of either the "A" or the "B" frequency transmitted by the coil $L^2$. If the switch 10 is opened, the system by reason of the tight coupling between the coils $L^1$ and $L^2$ will respond readily to currents of the "B" frequency while the same non-responsive condition will prevail with respect to currents of the "A" frequency in the coil $L^2$. With the switch 10 open or closed the desired amount of energy of the "A" frequency in the coil $L^2$ may be transmitted to the coil system $a$—$e$ by changing the position of the coil $L^2$ with respect to the electrical center of the coil system $a$—$e$ as shown by the arrow 11. The circuit disclosed in Figure 1ᵃ operates in a similar manner but by the transfer of current from the coil $L^2$ to the coil system $a$—$e$ is of the "B" frequency.

In the circuit shown in Figure 2, I have inserted an inductance $L^4$ in the connection $c$—$c'$, and have substituted a capacity $C^3$ in the place of the switch 10 of Figure 1. The inductance $L^4$ does not affect the "A" frequency and the capacity $C^3$ does not affect the "B" frequency for the reason that these two additional units are connected across the nodal points of the respective circuits.

However, the value of the "A" frequency is effected by the capacity factor $C^3$. Also the value of the "B" frequency is effected by the inductance factor $L^4$. Although shown as inductance and capacity it will be understood that the units may be inductances or capacities or combinations of both.

Since in the coil system $L^1$, the points $a$ and $e$, are connected together in such a manner that the "B" frequency and not the "A" frequency will prevail, the system responds as desired to the energy received from coil $L^2$. If coil $L^2$ is in the plate circuit of a vacuum tube amplifier, it should carry "B" frequency only. This requires that the grid of the vacuum tube amplifier should receive energy at "B" frequency only. Figure 2 shows one type of arrangement by which this result may be accomplished. The antenna-ground circuit is shown tightly coupled to coil system $a$—$e$ with respect to the "A" frequency, and in effect loosely or variably coupled as desired to the coil system $a$—$e$ with respect to the "B" frequency. Since coil $L^4$ is in the "B" frequency circuit, it functions independently of the current flow in coil system $a$—$e$ at the "A" frequency. Coupled to coil $L^4$ is a tuned "B" frequency circuit consisting of an inductance $L^5$ with a tuning condenser $C^4$ in parallel therewith which constitutes the input of a detector or amplifying circuit as desired.

It is known that most undesirable interferences arise from damped oscillatory discharges and shock excitations, such as "static," "strays" and other causes. Due to the tight coupling between coil $L^2$ and coil system $L^1$ at the "A" frequency, the shock or damped energy will cause coil system $L^1$ to oscillate at the "A" frequency but this excitation does not affect the coil $L^4$. By reason of the effective loose coupling at the "B" frequency between coil $L^2$ and coil system $L^1$, the latter will respond at the "B" frequency to the "B" frequency energy received by the antenna system. This response will be transmitted through the medium of coil $L^4$ to the detector or amplifier circuit coupled to coil $L^4$. Spurious excitations of the antenna system that cause it to oscillate at the "A" frequency, the period predetermined by the effect of the tight coupling to the coil system $L^1$ at this "A" frequency, will not be transmitted to the coil $L^4$ and the detector or amplifier circuit coupled thereto. In this manner the detection or amplification of undesired interferences of whatever kind or type is reduced to a minimum.

Separation of the values of the "A" and the "B" frequencies is accomplished by varying the separation of the two halves ($a$—$c$ and $c$—$e$) of inductance coil system $a$—$e$ and also by adjusting the values of the units, if any, between points $c$ and $c'$ and points $a$ and $e$.

Referring to Figure 1ª, the current flow at the "B" frequency being equal and in opposite directions in the two halves of the coil system $a$—$e$, if such a coil system is to be used as an oscillator at the "B" frequency, the opposing fields tend to neutralize undesirable effects of coupling to separate, distinct and distant circuits. In this manner interference caused by the function of the coil system $a$—$e$ as a generator and transmitting or radiating energy is eliminated. In the Figures 1 and 2 the elimination of extraneous disturbances is accomplished, if the coil system be an oscillator at the "A" frequency.

Further modifications are shown in Figures 3 and 4 the detail operation and construction of which are considered obvious from the foregoing description of the simple circuit.

Referring to Figure 3, 1 represents a vacuum tube oscillating at the "A" frequency and 2 represents a vacuum tube so arranged that it detects at the "B" frequency. The grid 6' of vacuum tube 2 is connected to coil $L^1$ through variable connection 12 which controls the potential upon the grid 6'.

Figure 4 represents a circuit in which vacuum tube 1 is oscillating at the "B" frequency and vacuum tube 2 is detecting at the "A" frequency.

Either of the circuits shown in Figures 3 and 4 are adaptable to either simultaneous reception and transmission of signals or may be used in heterodyne reception, the frequnecy of the resultant long wave being the difference in frequency between the "A" and "B" frequency.

As an alternative the filament may be connected to corresponding potential points of the coil system $a$—$e$ instead of to the condenser system as shown, without affecting the functioning of the system. Also one tube may function as an oscillator on one frequency while the other tube operates as a detector upon the other frequency.

In any of the circuits disclosed all of the tubes are capable of functioning at two frequencies in the following manner.

In Figures 1, 1ª and 2 the one tube may act as a detector at one frequency and simultaneously as an oscillator at the other frequency, detect at both frequencies or oscillate at both frequencies. In the circuits shown in Figures 3 and 4 one tube may be substituted for the two tubes to obtain the results heretofore described by merely using the well known methods of blocking or by-passing, the alternating and direct currents in the circuit as required.

It will be understood that the above description and accompanying drawings comprehend only the general and preferred embodiment of my invention and that minor detail changes in the construction and arrangement of parts may be made within the scope of the appended claims without sacrificing any of the advantages of my invention.

Having thus described my invention what I claim is as follows:

1. In combination, a coil system comprising a plurality of sections, condensers in parallel with each section and means for regeneration at the resonant frequency of the entire system and for regeneration at the resonant frequency of the individual sections independent of the resonant frequency of the entire system, the said means comprising a coil coupled to the entire system and rotatable through 180 degrees of coupling with the coil system.

2. In combination, a coil system comprising a plurality of sections, a condenser in parallel with each section, said sections being inductively coupled together to produce a circuit resonant at a plurality of frequencies, a vacuum tube, the electrodes of which are connected to the coil system at a plurality of points, and an input coil inductively coupled to the system and variably coupled with reference to the sections to activate the vacuum tube at a single resonant frequency of the coil system.

3. In combination, a coil system comprising a plurality of sections, a condenser in parallel with each section, said sections being inductively coupled together to produce a circuit resonant at a plurality of frequencies, a vacuum tube, the electrodes of which are connected to the coil system at a plurality of points, and an input coil inductively coupled to the system and variably coupled with reference to the sections to activate the vacuum tube at the frequency determined by the additive inductance of the sections.

4. In combination, a coil system comprising a plurality of sections, a condenser in parallel with each section, said sections being inductively coupled together to produce a circuit resonant at a plurality of frequencies, a vacuum tube, the electrodes of which are connected to the coil system at a plurality of points, and an input coil inductively coupled to the system and variably coupled with reference to the sections to activate the vacuum tube at the frequency determined by the subtractive inductance of the sections.

5. In combination, a coil system comprising a plurality of sections, a condenser in parallel with each section, said sections being inductively coupled together to produce a circuit resonant at a plurality of frequencies, means responsive to high frequency connected to said system at a plurality of points, and an input coil inductively coupled to the system and variably coupled with reference to said sections to activate said means at a single resonant frequency of the system.

6. In combination, a coil system comprising a plurality of sections, a condenser in parallel with each section, said sections being inductively coupled together to produce a circuit resonant at a plurality of frequencies, means responsive to high frequency currents connected to said system at a plurality of points, and an input coil inductively coupled to the system and variably coupled with reference to the sections to activate said means at a plurality of frequencies.

7. In combination, a coil system comprising a plurality of sections, a condenser in parallel with each section, said sections being inductively coupled together to produce a circuit resonant at a plurality of frequencies, means responsive to high frequency currents connected to said system at a plurality of points, and an input coil inductively coupled to the system and variably coupled with reference to the sections to activate said means at the frequencies determined by the additive and the subtractive inductance of the sections of the system.

JAMES E. PARKER.